UNITED STATES PATENT OFFICE 2,683,144

POLYMERIZATION OF ISOCYANATES

Walter Jean Balon, Carneys Point, and Otto Stallmann, Bridgeton, N. J., assignors to E. I. du Pont de Nemours & Company, Wilmington, Del., a corporation of Delaware No Drawing. Application October 2, 1951, Serial No. 249,404

9 Claims. (Cl. 260—239)

This invention relates to reactions of organic isocyanates and more particularly to a process for preparing dimeric compounds from isocyanates. Still more particularly it relates to a method of controlling the reaction so as to avoid the formation of undesired by-products.

Organic isocyanates are useful in a wide variety of applications, such as in adhesives and as treating agents for textiles, paper, leather and rubber. In the free state, they are extremely reactive, are sensitive to water and are susceptible to polymerization. It has been found that a useful method of employing these materials is to convert them first into dimeric compounds which are believed to contain uretidinedione groups. These compounds are formed by the polymerization of isocyanates in the presence of a suitable catalyst, probably according to the following reaction:

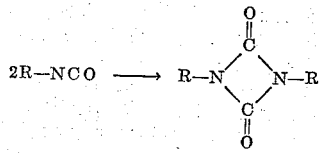

From the dimer, the original isocyanate may then be regenerated by heating. The dimer may be applied to the material with which the isocyanate is to be reacted, and the isocyanate regenerated in situ, thus avoiding any undesired side reactions or deterioration of the isocyanate prior to use.

Catalysts which have been proposed for the polymerization reaction include triethylphosphine and pyridine. Triethylphosphine is highly sensitive to air oxidation, so that it must be used under a blanket of nitrogen. Furthermore, it is so vigorous a catalyst that with it the reaction cannot be controlled when carried out on a large scale. Instead of the desired dimeric product, higher polymers and particularly isocyanurate esters having the formula:

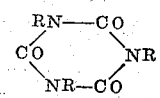

are obtained. The original isocyanate cannot be regenerated from these products. Pyridine on the other hand is a very mild catalyst. With it, the reaction takes an impractically long time and it is necessary to use large amounts of pyridine, up to several times the weight of the isocyanate. This involves the handling of large volumes and requires apparatus of large capacity. In copending application Serial No. 248,270 of Otto Stallmann, filed September 25, 1951, there is described the use of mixed aromatic-aliphatic tertiary phosphine catalysts which have a high degree of activity but are less sensitive than is triethylphosphine. Even with these superior catalysts, there is a tendency for the temperature of the reaction mixture to rise above the desired operating range and for isocyanurates to be formed unless small batches are employed or unless large amounts of solvents or diluents are added.

It is an object of this invention to provide a method for controlling the catalytic polymerization of isocyanates so as to avoid the formation of isocyanurates and other undesired products. A further object is to provide a means for stabilizing dimeric products against further polymerization. A further object is to permit the use of a catalyst having a high degree of activity in promoting the formation of dimeric products. A further object is to eliminate the objectionable phosphine odor in the products of reaction. A still further object is to permit the interruption of the reaction whenever the temperature becomes too high and the resumption of the polymerization at any time after the mixture has become cool. Still further objects will appear from the description of the invention which follows.

According to the present invention, the formation of undesired by-products by the excessive polymerization of isocyanates in the presence of a tertiary phosphine catalyst is prevented by adding to the reaction mixture as an inhibitor an alkylating agent. In order to stop the polymerization completely, it is necessary to add an amount of the alkylating agent which is at least equivalent stoichiometrically to the amount of phosphine catalyst.

The agents which have been found to be effective inhibitors for the polymerization are the common alkylating agents, such as the alkyl halides, the dialkyl sulfates and the alkyl esters of aryl and cycloalkyl sulfonic acids. Aralkyl halides, such as benzyl chloride, p-xylyl dichloride, phenylethyl chloride and ditolyl dichloride, having the formula:

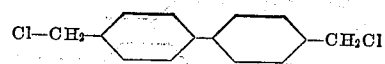

and the corresponding bromides and iodides represent a particularly useful group of alkylating agents. Of the aralkyl halides, the chlorides and particularly benzyl chloride are preferred agents by reason of their lower costs. In the case of the alkyl esters of aryl and cycloalkyl sulfonic acids, the lower alkyl derivatives and particularly those in which the alkyl group contains from 1 to 4 carbon atoms are more active inhibitors of the polymerization than are the higher members of the series and are therefore preferred. Useful members of this group include methyl cyclohexane sulfonate, ethyl cyclohexane sulfonate, n-butyl cyclohexane sulfonate, methyl cyclopentane sulfonate, methyl benzene sulfonate, ethyl benzene sulfonate, methyl toluene sulfonate and methyl naphthalene sulfonate. Of the alkyl halides the bromides and iodides have greater activity than the corresponding chlorides. The lower alkyl bromides such as the methyl, ethyl, propyl and n-butyl derivatives are the most useful members of this group of compounds.

This invention is applicable to the polymerization of organic isocyanates generally and is particularly useful with aromatic isocyanates. These include mono-isocyanates such as phenyl isocyanate, tolyl isocyanates, xylyl isocyanates, naphthyl isocyanates, biphenyl isocyanates and compounds of any of these types in which the aromatic nucleus is substituted by alkyl, aryl, cycloalkyl, ester, ether, thioether, nitro or halogen groups or combinations thereof. Also included are diisocyanates such as 2,4-toluene diisocyanate, 4-chloro-1,3-phenylene diisocyanate, 2-chloro-1,4-phenylene diisocyanate, 2-methoxy-1,4-phenylene diisocyanate and 2-nitro-1,4-phenylene diisocyanate. Other usable isocyanates include compounds such as

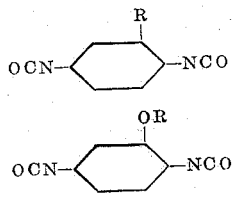

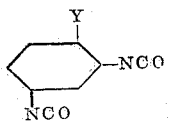

or

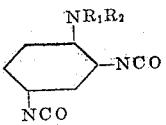

in which Y represents an ester group such as —OOCR or —COOR and in which R represents an alkyl, aryl, aralkyl or cycloalkyl group of from 1 to 10 carbon atoms. The aromatic nucleus may also be substituted with a tertiary amino group as in the compound

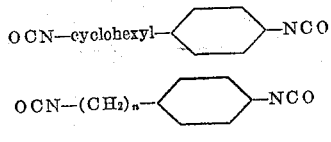

in which $R_1$ and $R_2$ represent alkyl, aryl, aralkyl or cycloalkyl groups, the total number of carbon atoms in $R_1$ and $R_2$ being from 2 to 12. Other diisocyanates containing a single phenyl group which are useful in the process of this invention are

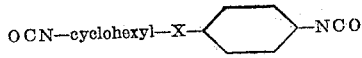

in which X represents O, S, CO, $SO_2$ or $(CH_2)_n$, and similar compounds in which X represents an alkylene group which is interrupted by a hetero atom such as oxygen, sulfur or nitrogen. In these compounds $n$ may be from 1 to 12. The diisocyanates may contain naphthyl groups as in

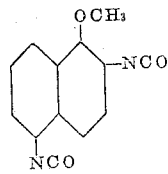

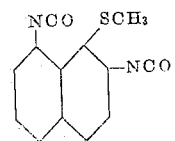

or a plurality of phenyl groups as in

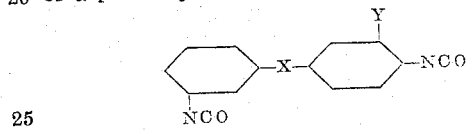

where X is O, S, CO, $SO_2$, CH=CH, —N=N, $(CH_2)_n$ or an alkylene group which is interrupted by a hetero atom such as oxygen, sulfur or nitrogen, where Y is a saturated or unsaturated hydrocarbon group, an ether group, an ester group, a tertiary amino group, —NCS, halogen or nitro, and where $n$ is from 1 to 12.

The excessive polymerization of aliphatic and cycloaliphatic isocyanates in the presence of a tertiary phosphine catalyst may also be inhibited by the process of this invention. Examples of such compounds are octyl isocyanate, dodecyl isocyanate, ethylene diisocyanate, trimethylene diisocyanate, hexamethylene diisocyanate, propylene-1,2-diisocyanate, cyclopentane-1,3-diisocyanate and the like.

When a monoisocyanate is employed in the polymerization reaction, the product can contain only one isocyanate-to-isocyanate linkage and is hence a dimer. When diisocyanates are used in this reaction, the product is ordinarily a dimer but may in some cases be a higher reaction product which contains a plurality of such isocyanate-to-isocyanate linkages. As in the case of 2,4-toluene diisocyanate, many of these compounds have one isocyanate group which is appreciably more reactive than the other. In such cases the reaction in the presence of the phosphine catalyst ordinarily yields a dimer containing a single isocyanate-to-isocyanate linkage and free isocyanate groups. The same result is obtained when the dimer because of its physical form is quickly withdrawn from the reaction medium, as by precipitation. When the two isocyanate groups are equally reactive and when the dimer remains in available physical condition for further reaction, polymeric products will form to some extent. Such products contain additional linkages, probably uretidinedione rings, from which the original isocyanate monomers may be regenerated if desired. These compounds are to be distinguished from undesired higher reaction products such as the isocyanuric esters which are obtained with other catalysts and from which the monomeric isocyanates may not readily be regenerated.

The reaction may be conducted with a single monomeric isocyanate or with a mixture of different monomers. The reactivity of the resulting products may be varied by using a mixture of varying proportions of mono- and diisocyanates.

The process of controlling the polymerization herein disclosed is applicable with any tertiary phosphine catalyst, although the most satisfactory operation will result from the use of mixed aromatic-aliphatic tertiary phosphines such as are used in the process of copending application Serial No. 248,270, filed September 25, 1951. These preferred catalysts are selected from the group consisting of (Ar)$_2$AlkP, Ar(Alk)$_2$P and ArBivP, in which Ar represents a mononuclear aryl radical, Alk represents a lower alkyl radical and Biv represents a bivalent aliphatic radical forming with the phosphorus atom a heterocyclic ring. Suitable mononuclear aryl radicals include phenyl, tolyl, xylyl and anisyl. The most useful alkyl radicals are those containing from 1 to 6 carbon atoms, such as methyl, ethyl, propyl, isopropyl, n-butyl, isobutyl, amyl and hexyl. The bivalent aliphatic radical may for example be a tetramethylene or pentamethylene radical or such a radical containing lower alkyl substituents or olefinic unsaturation. Typical catalysts of this class include phenyldimethylphosphine, tolyldimethylphosphine, ethyldiphenylphosphine, phenyldi(n-butyl)phosphine, and 1-phenyl-3-methyl-1-phospha-3-cyclopentene. The preferred catalysts are phenyldimethylphosphine and phenyldi(n-butyl)phosphine.

Although the manner in which the alkylating agents inhibit the polymerization reaction is not completely understood, it appears probable that the alkylating agent and the tertiary phosphine catalyst react together to form a phosphonium compound which has no catalytic activity. This phosphonium adduct is inert and does not interfere with further polymerization or in most cases with the subsequent reactions of the dimer. For this reason it is ordinarily unnecessary to remove the adduct from the reaction products.

The polymerization of isocyanates to yield dimers is exothermic, and in the presence of an active catalyst the temperature is apt to rise to the point where the reaction becomes uncontrollable and undesired by-products are obtained. The maximum temperature which can be permitted without this taking place varies, depending upon the particular isocyanate and catalyst, but is usually from 50 to 60° C. According to the present invention, the polymerization reaction may be carried on until the temperature approaches the upper end of the desired operating range. At this point the alkylating agent is added in an amount which is at least equivalent stoichiometrically to the phosphine catalyst, so as to bring the polymerization to a standstill. The reaction mixture may then be cooled to room temperature or any other convenient level within the desired operating range. When additional fresh catalyst is added, the polymerization reaction will continue. The added alkylating agent does not function as a catalyst poison so as to interfere with the activity of the additional phosphine catalyst when the latter is in stoichiometric excess. In this way it is possible to use an active catalyst and to avoid excessive amounts of solvents while preventing the formation of undesired polymeric by-products. Instead of completely stopping the polymerization, it is also possible to add less than equivalent amounts of the alkylating agent so as to produce a partial inhibition of the reaction.

It is also advantageous to add the alkylating agent after the dimerization of the isocyanate is substantially complete. This destroys the disagreeable phosphine odor which tends to cling tenaciously to the final product even after attempts at purification, and further tends to prevent further polymerization or rearrangement to form compounds such as the isocyanurates. If the original isocyanate is a diisocyanate, dimers formed therefrom will contain free isocyanate groups. In the presence of the phosphine catalyst, further reaction between such dimers may take place with the formation of high polymers containing a plurality of isocyante-to-isocyanate linkages. Although the isocyanate may be regenerated from such polymers, their physical form makes them less useful than the dimers and other lower polymers. Addition of the alkylating agent when the original polymerization to dimers is substantially complete will prevent the formation of these polymers.

The practice of the present invention will ordinarily involve the use of amounts of the alkylating agent which are in slight stoichiometric excess over the amount of tertiary phosphine catalyst. The catalyst is usually present in amount equal to from 0.1 to 10% by weight based on the amount of isocyanate, and the ordinary addition of alkylating agent will also be of this same magnitude. Amounts up to about 2% of the weight of isocyanate will most commonly be employed.

The process of this invention is illustrated by the following examples:

Example 1

To 10 parts by weight of phenyl isocyanate is added at room temperature 0.06 part of phenyldimethylphosphine. After a very short time the catalyst initiates a vigorous reaction, as shown by the appearance of rapidly increasing amounts of colorless crystals of the dimer of phenyl isocyanate, accompanied by a rather sudden rise in the temperature of the reaction mass. Almost immediately after the crystals of the dimer begin to precipitate out of solution and before the reaction temperature has risen above 40–50° C., there is added quickly to the reaction mass 0.1 part of the inhibitor methyl cyclohexane sulfonate of the structure:

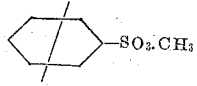

Immediately after the methyl cyclohexane sulfonate has been added, all further dimerization ceases and the unreacted portion of the monomeric phenyl isocyanate remains completely stable in the liquid phase. At the same time no further rise in temperature is observed and the reaction mass remains colorless. The precipitate crystals of the dimer which are suspended in the liquid monomer remain unchanged during storage of the reaction mass for 3 days at room temperature.

To this stored (undiluted) phenyl isocyanate reaction mass is added 0.08 part of the phenyldimethylphosphine catalyst. Immediately, as soon as this new portion of the fresh catalyst has been added, more crystals of the dimer of phenyl isocyanate begin to separate out again, accompanied by a moderate rise in temperature. After two hours, a solid crystalline mass has formed, which indicates that the dimerization reaction is complete. The crystalline solid product is then suspended in approximately 50 parts of warm carbon tetrachloride, the slurry is filtered, and the cake is washed with petroleum ether and dried, giving 7.6 parts by weight of the pure dimer of phenyl isocyanate in the form of plates which melt at 174–175° C.

*Example 2*

To two separate charges, each containing 5 parts by weight of phenyl isocyanate dissolved in 5 parts by weight of dried benzene, are added separately portions of 0.08 part each of the catalyst phenyldimethylphosphine. A considerable amount of the dimer crystallizes out of solution and there is an accompanying rise in temperature. After the mixture stands at room temperature for a period of 24 hours, about 0.1 part of the inhibitor benzyl chloride is added to one of the charges and the two charges are then stored for a period of 37 days.

The charge containing the inhibitor contains pure white crystals of the dimer which after filtration and washing of the cake with 10 parts by volume of petroleum ether, followed by drying, melt at 175–176° C. The yield is 4.2 parts of the pure dimer, corresponding to 84% of the theoretical yield.

The second charge to which no inhibitor has been added, liberates constantly during storage a small amount of gas and develops a slight pressure which must be released continually from the closed reaction vessel. This reaction mass acquires a yellow coloration. When the dimer from this charge is worked up in the same manner as described above, the isolated dimer shows a melting range from 175° to 186° C., and the yield of this impure dimer is 3.5 parts by weight, corresponding to only 70% of the theoretical yield.

*Example 3*

To a solution containing 3 parts by weight of phenyl isocyanate in 10 parts by volume of ortho-dichlorobenzene is added at room temperature 0.1 part of the catalyst phenyl dimethylphosphine. After about 5 minutes when the first crystals of the phenyl isocyanate dimer have appeared, 0.1 part of benzyl chloride is added and intimately mixed in. The effect is almost immediate and further crystallization of the dimer is completely inhibited, although the benzyl chloride has been added at the initial (most vigorous) state of the dimerization reaction. As soon as the inhibitor has been added, the temperature ceases to rise and the penetrant and offensive odor of the phosphine catalyst disappears completely from the reaction mass.

After this mixture has stood for several days, dimerization is re-initiated by the addition of about 0.2 part more of phenyldimethylphosphine. A satisfactory yield of the dimer is obtained.

We claim:

1. In the preparation of a dimeric compound by the polymerization of an aromatic isocyanate in the presence of a tertiary phosphine catalyst, the method of stopping the polymerization at a desired point which comprises adding to the reaction mixture an amount of an alkylating agent which is at least equivalent stoichiometrically to the amount of phosphine catalyst, said alkylating agent being a member of the class consisting of aralkyl halides, alkyl halides, dialkyl sulfates, alkyl esters of aryl sulfonic acids and alkyl esters of cycloalkyl sulfonic acids.

2. A process according to claim 1 in which the alkylating agent is methyl cyclohexane sulfonate.

3. A process according to claim 1 in which the aylklating agent is benzyl chloride.

4. In a process of making a dimeric compound by the polymerization of an aromatic isocyanate in the presence of a tertiary phosphine catalyst, the step which comprises adding to the reaction mixture, after substantially all of the isocyanate has reacted to form a dimer, an amount of an alkylating agent which is at least equivalent stoichiometrically to the amount of phosphine catalyst, said alkylating agent being a member of the class consisting of aralkyl halides, alkyl halides, dialkyl sulfates, alkyl esters of aryl sulfonic acids and alkyl esters of cycloalkyl sulfonic acids.

5. In a process of making a dimeric compound by the polymerization of an aromatic isocyanate in the presence of a tertiary phosphine catalyst, the step which comprises adding to the reaction mixture, after substantially all the isocyanate has reacted to form a dimer, an amount of an alkyl ester of a cycloalkane sulfonic acid in which the alkyl radical contains from 1 to 4 carbon atoms which is at least equivalent stoichiometrically to the amount of phosphine catalyst.

6. In a process of making a dimeric compound by the polymerization of an aromatic isocyanate in the presence of a tertiary phosphine catalyst, the step which comprises adding to the reaction mixture, after substantially all the isocyanate has reacted to form a dimer, an amount of an aralkyl chloride which is at least equivalent stoichiometrically to the amount of phosphine catalyst.

7. In a process of making a dimeric compound by the polymerization of an organic isocyanate in the presence of a tertiary phosphine catalyst, the steps which comprise interrupting the polymerization when the temperature reaches the upper end of the desired operating range by adding an amount of an alkylating agent which is at least equivalent stoichiometrically to the amount of catalyst present, said alkylating agent being a member of the class consisting of aralkyl halides, alkyl halides, dialkyl sulfates, alkyl esters of aryl sulfonic acids and alkyl esters of cycloalkyl sulfonic acids, allowing the temperature to fall, and thereafter adding additional phosphine catalyst to continue the polymerization.

8. A process according to claim 7 in which the alkylating agent is an alkyl ester of a cycloalkane sulfonic acid in which the alkyl radical contains from 1 to 4 carbon atoms.

9. A process according to claim 7 in which the alkylating agent is an aralkyl chloride.

References Cited in the file of this patent

UNITED STATES PATENTS

| Number | Name | Date |
|---|---|---|
| 2,520,601 | Lee | Aug. 29, 1950 |

OTHER REFERENCES

Hoffman, Ber. Deut. Chem., col. 4, pages 246–251 (1871).

Bayer, Angew. Chem., vol. 59, pages 261–270 (1947).